US012449408B1

United States Patent
Sultana

(10) Patent No.: US 12,449,408 B1
(45) Date of Patent: Oct. 21, 2025

(54) METHOD FOR MANUFACTURING SENSORS ON MULTI- FUNCTIONAL SENSOR PLATFORM

(71) Applicant: United States of America as represented by the Administrator of NASA, Washington, DC (US)

(72) Inventor: Mahmooda Sultana, Laurel, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 493 days.

(21) Appl. No.: 17/955,883

(22) Filed: Sep. 29, 2022

(51) Int. Cl.
*G01N 33/00* (2006.01)
*B82Y 30/00* (2011.01)
*B82Y 40/00* (2011.01)
*H05K 3/30* (2006.01)

(52) U.S. Cl.
CPC ......... *G01N 33/0009* (2013.01); *H05K 3/303* (2013.01); *B82Y 30/00* (2013.01); *B82Y 40/00* (2013.01); *H05K 2201/10151* (2013.01)

(58) Field of Classification Search
CPC ............... G01N 33/0009; H05K 3/303; H05K 2201/10151; B82Y 30/00; B82Y 40/00
USPC ......................................................... 73/23.2
See application file for complete search history.

(56) References Cited

U.S. PATENT DOCUMENTS

| 2017/0268996 | A1* | 9/2017 | Krottmaier | G01N 33/12 |
| 2018/0045698 | A1* | 2/2018 | Sultana | G01N 27/127 |
| 2019/0250135 | A1* | 8/2019 | Andersson | G01N 27/12 |
| 2023/0110328 | A1* | 4/2023 | Carbonelli | G01N 33/0034 |
| | | | | 702/24 |

FOREIGN PATENT DOCUMENTS

| CN | 106596652 A | * 4/2017 | B82Y 30/00 |
| WO | WO-2023212728 A1 | * 11/2023 | G01N 33/5438 |

* cited by examiner

*Primary Examiner* — Peter J Macchiarolo
*Assistant Examiner* — John M Royston
(74) *Attorney, Agent, or Firm* — Derek J. Langdon; Matthew F. Johnston; Trenton J. Roche

(57) ABSTRACT

A method of fabricating a multi-functional platform including at least one gas sensor. The method comprises the steps of providing a printed circuit board (PCB) including a chip integrated on the PCB, and providing a picoliter dispenser having a moveable dispenser head with a nozzle. Then, a gas sensor base layer is formed by depositing a nanostructure directly on a substrate of the chip. The nanostructure includes an unfunctionalized nanomaterial. Next, the gas sensor base layer is functionalized by deposing a functional group of nanomaterial to the gas sensor base layer using the picoliter dispenser so as to form the at least one gas sensor. Alternatively, the gas sensor is fabricated by preparing a suspension of unfunctionalized nanomaterials, then functionalizing the suspension of the unfunctionalized nanomaterials by mixing the unfunctionalized suspension with one of different functional groups, then depositing the functionalized suspension directly to the chip using the picoliter dispenser.

18 Claims, 5 Drawing Sheets

METHOD FOR MANUFACTURING SENSORS ON MULTI- FUNCTIONAL SENSOR PLATFORM

ORIGIN OF THE INVENTION

The invention described herein was made by employees of the United States Government, and may be manufactured and used by or for the Government for Government purposes without the payment of any royalties thereon or therefore.

FIELD OF THE INVENTION

The present invention relates to a method for manufacturing a sensor on a multi-functional sensor platform, the sensor platform including a plurality of environmental sensors deposited nanomaterials directly on a substrate of a single chip.

BACKGROUND OF THE INVENTION

Currently, sensors and electronics are deposited onto separate chips and then electronically interconnected to outputs as well as to each other. Although nanomaterials have been used in sensors in the lab to demonstrate superior device performance and miniaturization, and also used in a variety of other applications such as electronics, optics, energy harvesting and storage, and biotechnology, nanomaterial-based devices have challenges including scalability, and tedious manual fabrication processes, leading to low yield and poor reproducibility.

Typically, the process of functionalizing sensors with different functional groups on a single chip is achieved by manually pipetting a nanoparticle suspension or polymers using micropipettes. The smallest volume that can be dispensed with a micropipette is 1 microliter, six orders of magnitude higher volume than the disclosed process. However, that volume does not allow the user to selectively deposit a functional group on one sensor element in an array of sensors on a single chip without using masks. A fabricator may need to mask all but one sensor element before dispensing a particular functional group onto the non-masked sensor element.

Alternatively, the functional groups may be deposited using other techniques, such as electron beam evaporation, sputtering, atomic layer deposition, etc. in order to functionalize each sensor element with different functional groups, all but one sensor element has to be masked again. Masking often requires a photolithography step using a photoresist or a shadow mask. So, to put a plurality of different functional groups in an array, one has to do photolithography several times. This process is not only labor intensive, but it exposes the nanomaterial-based sensors to photoresist and solvent several times, which may cause contamination that compromises the sensitivity of the sensors.

Nanomaterial-based sensors made by conventional techniques suffer from either random deposition of the functional groups, or variations induced by manual microfabrication processes. This random distribution and variation affect the performance and reproducibility of the sensors. Conventional nanomaterial-based sensors do not control for alignment and positioning of nanomaterials spanning between the electrodes. The resultant sensor may have none or many different pieces of a nanomaterial that form bridges connecting the two electrodes. Furthermore, each nanomaterial bridge is composed of a different amount of nanomaterial.

While conventional methods for manufacturing several nanomaterial-based sensors on a single chip have proven to be acceptable for some applications and conditions, improvements that may enhance their performance, precision and sensitivity, and reduce cost of manufacturing thereof are possible.

SUMMARY OF THE INVENTION

According to a first aspect of the invention, a method is provided for fabricating a multi-functional sensor platform including at least one gas sensor device. The method comprises the steps of providing a printed circuit board (PCB) including a chip, and a picoliter dispenser having a moveable dispenser head with a nozzle. The chip is integrated on the PCB and includes a substrate. Next, a gas sensor base layer of the at least one gas sensor is formed by depositing a nanostructure directly on the substrate of the chip. The nanostructure includes an unfunctionalized nanomaterial. Then, the gas sensor base layer is functionalized by depositing a functional group of nanomaterial onto the gas sensor base layer using a picoliter dispenser so as to form the at least one gas sensor.

According to a second aspect of the invention, another method is provided for fabricating a multi-functional platform including at least one gas sensor. The method comprises the steps of providing a printed circuit board (PCB) including a chip, and a picoliter dispenser having a moveable dispenser head with a nozzle. The chip is integrated onto the PCB and includes a substrate. Next, a suspension of unfunctionalized nanomaterials for forming at least one gas sensor is prepared. Subsequently, the suspension of the unfunctionalized nanomaterials is functionalized by mixing the unfunctionalized suspension with one of different functional groups, so as to form a functionalized suspension of nanomaterials. Then the functionalized suspension is deposited directly onto the chip using the picoliter dispenser, so as to form the at least one gas sensor made of functionalized nanomaterial.

Other aspects of the invention will become more apparent upon reading the following detailed description of the exemplary embodiments.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. It should be understood, however, that the invention is not limited to the precise arrangements and instrumentalities shown. The objects and advantages of the invention will become apparent from a study of the following specification when viewed in light of the accompanying drawings, in which like elements are given the same or analogous reference numerals. In these drawings.

DETAILED DESCRIPTION OF THE PREFERRED EMBODIMENTS

Figure 1:
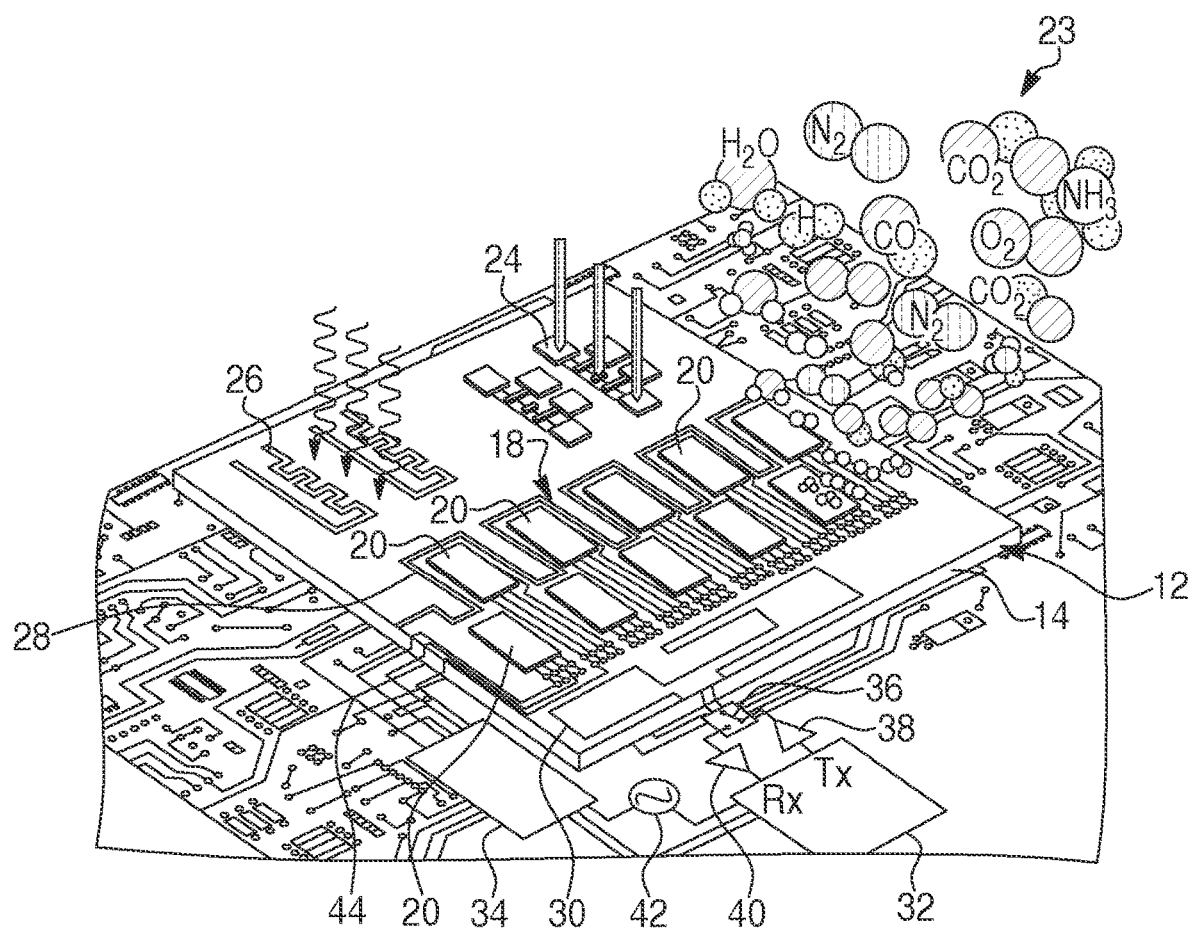
FIG. 1 is a perspective view of a multi-functional sensor platform including an array of environmental sensors according to an exemplary embodiment of the present invention.

The exemplary embodiment(s) of the present invention will now be described with the reference to accompanying drawings. The following description of the preferred embodiment(s) is merely exemplary in nature and is in no way intended to limit the invention, its application, or uses.

For purposes of the following description, certain terminology is used in the following description for convenience only and is not limiting. In the description, relative terms such as "horizontal," "vertical," "up," "down," "upper", "lower", "right", "left", "top" and "bottom" "front" and "rear", "inwardly" and "outwardly" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected?" refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. The term "integral" (or "integrally") or "unitary" (or "unitarily") relates to a part made as a single part, or a part made of separate components fixedly (i.e., non-moveably) connected together. The words "smaller" and "larger" refer to relative size of elements of the apparatus of the present invention and designated portions thereof. Additionally, the word "a" and "an" as used in the claims means "at least one" and the word "two" as used in the claims means "at least two". For the purpose of clarity, some technical material that is known in the related art has not been described in detail in order to avoid unnecessarily obscuring the disclosure.

FIG. 1 shows a multi-functional sensor platform of an exemplary embodiment of the present invention comprising a single integrated, non-etched chip 12 on a printed circuit board (PCB). The multi-functional sensor platform includes an array 18 (or environmental sensor system) of different gas sensors $20_1$-$20_8$ directly formed onto a rigid or flexible substrate 14 of the single chip 12 with nanometer-scaled materials. In view of the structural and geometrical similarities of the gas sensors $20_1$-$20_8$ and in the interest of simplicity, the following discussion sometimes will use a reference numeral without a letter to designate an entire group of substantially identical structures. For example, the reference numeral 20 sometimes will be used when generically referring to one or more of the gas sensors $20_1$-$20_8$. The gas sensors 20 are configured for detecting various gases 23 and/or volatiles, such as hydrogen ($H_2$), hydrogen sulfide ($H_2S$), methane ($CH_4$), ammonia ($NH_3$), water ($H_2O$), and acetone, as best shown in FIG. 1. The multi-functional sensor platform further includes a pressure sensor 24 and a temperature sensor 26 directly deposited onto the single chip 12, and associated electronics for onboard computation, on-chip heaters (e.g., micro-heater 28), power source and wireless communication module (e.g., an antenna structure 30), packaged in a self-contained unit. In the exemplary embodiment, nanomaterials are used for the environmental sensors 20, 24, 26, etc. The nanomaterials are highly sensitive (i.e., parts per billion) at room temperature, and they have a high surface-to-volume ratio, superior electrical properties, and are low resource (i.e., small, light, low power). Preferably, the nanomaterials are made of a radiation hardened material.

The antenna structure 30 is provided on the multi-sensor chip 12. The antenna structure 30 is made of carbon nanotube (CNT), for example. However, the antenna structure 30 can be made with any suitable conductive material, such as silver or gold. Preferably, a wireless communication module is provided using Radio Frequency (RF) passive components: the antenna structure 30, microstrip transitions, and interconnects on the single chip 12. The remaining electronics (e.g., transceiver 32) on the main PCB are surface mounted to provide a full duplex communication system. The wireless communication module uses two integrated circuits (ICs), a configurable field programmable gate array (FPGA) 34 (i.e., from Microsemi) for data processing. The wireless communication module further uses configurable radio frequency (RF) transceiver 32 which connects to the antenna structure 30 via an RF switch 36 and power amplifier (PA) 38 and low noise amplifier (LNA) 40. An oscillator 42 forwards the data processed from the FPGA 34 to the antenna 30 or data transmission.

As disclosed above, the single chip 12 includes the array 18 of the different gas sensors $20_1$-$20_8$ with each sensor $20_1$-$20_8$ having the same or different printed geometry. After the gas sensors $20_1$-$20_8$ have been formed, they are functionalized with, for example, metal or metal oxide nanoparticles, or with polyaniline. Depending on the target gases, porous ceramic nanoparticles (NP), palladium (Pd), platinum (PT), ruthenium (Ru), silver (Ag), polyaniline film, or tin oxide ($SnO_2$) NP may be utilized for functionalization. Moreover, each of the gas sensors $20_1$-$20_8$ is functionalized with one or more different functional groups. Each functional group is associated with a specific response to a particular gas of volatile liquid.

Figure 2:
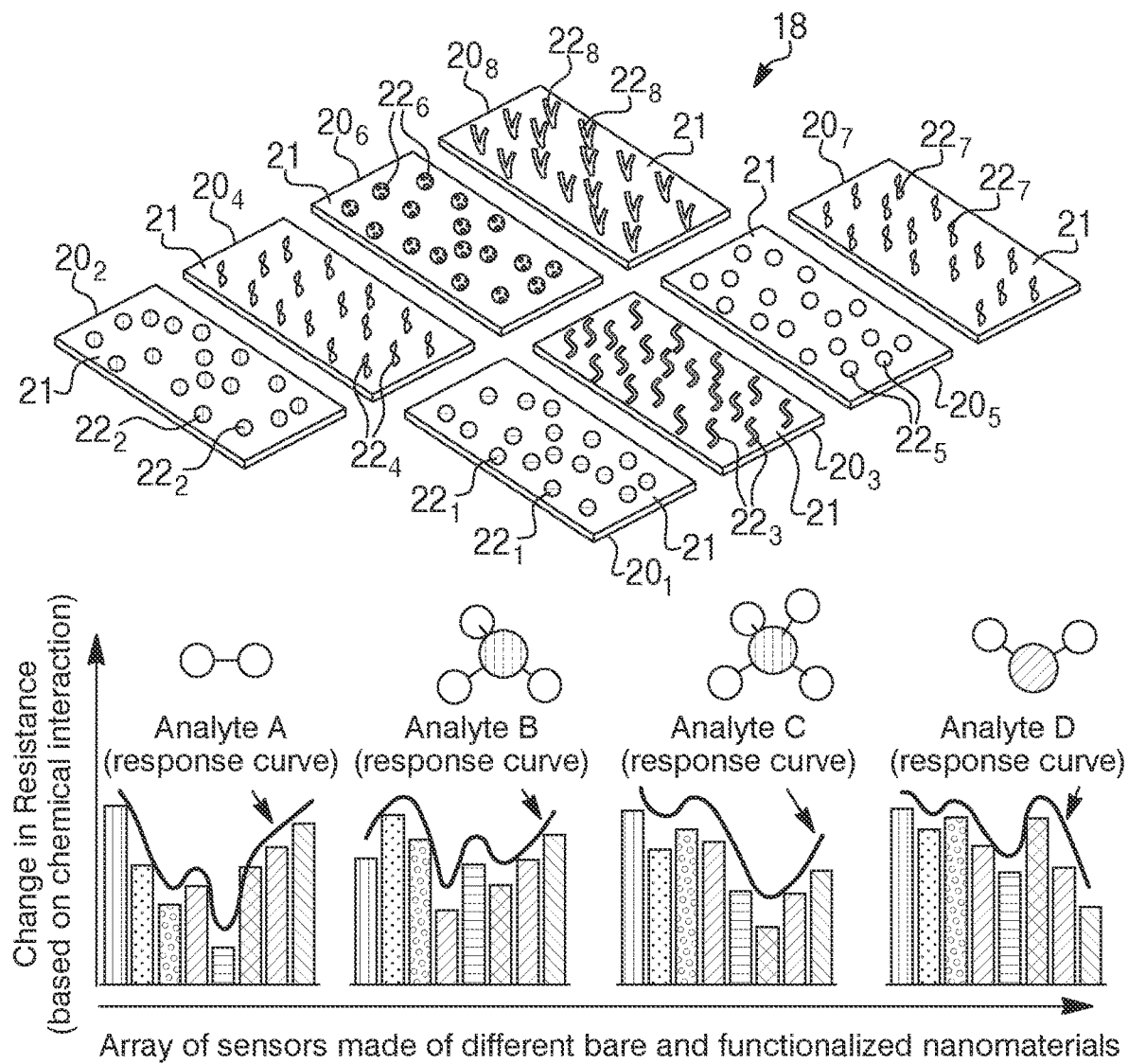
FIG. 2 is a perspective view of the sensor array with a plurality of gas sensors which detect different analytes according to the exemplary embodiment of the present invention, and corresponding graphs thereof showing a change in resistance based on chemical interaction.

The array 18 of the gas sensors 20 defines an electronic nose (best shown in FIG. 2) that comprises multiple base gas sensors 20, each having a different attached functional group. Specifically, according to the exemplary embodiment, each of the gas sensors $20_1$-$20_8$ includes a sensor base layer (or sensor element) 21 made preferably of graphene and carbon nanotubes (CNT), and functional groups $22_1$-$22_8$, respectively, as best shown in FIG. 2. Moreover, the functional groups $22_1$-$22_8$ are different from each other. In view of the structural and geometrical similarities of the gas sensors $20_1$-$20_8$, and in the interest of simplicity, the following discussion sometimes will use a reference numeral without a letter to designate an entire group of substantially identical structures. For example, the reference numeral 22 sometimes will be used when generically referring to one or more of the functional groups $22_1$-$22_8$. Non-limiting examples of the functional groups, depending on the target gases, are nanoparticles (NP) of porous ceramic nanoparticles (NP), palladium (Pd), platinum (PT), ruthenium (Ru), silver (Ag), polyaniline film, or tin oxide ($SnO_2$) NP.

According to the exemplary embodiment, non-limiting examples of the nanomaterial-based gas sensors $20_1$-$20_8$ include hydrogen ($H_2$), hydrogen sulfide ($H_2S$), methane ($CH_4$), ammonia ($NH_3$) gas sensors or a water ($H_2O$) sensor. Moreover, the gas sensor 20 configured to detect hydrogen ($H_2$) is deposited with the functional group including Pt (platinum), Pd (palladium), Ni—Pd (nickel-palladium alloy) and $SnO_2$ (stannic oxide). The gas sensor 20 configured to detect ammonia ($NH_3$) is deposited with the functional group including Pt, Polyaniline and $WS_2$ (tungsten disulfide). The gas sensor 20 configured to detect methane ($CH_4$) is deposited with the functional group including $SnO_2$ (stannic oxide) with Cu (copper) doping, Ru (Ruthenium) and Rb (Rubidium). The gas sensor 20 configured to detect water ($H_2O$) is deposited with the functional group including magnesium oxide and graphene oxide.

However, one of ordinary skill in the art would know that the multi-functional sensor platform can be customized for most other gases and volatiles that can have applications in not just space science, but also process monitoring, environment monitoring, medical diagnosis, etc. According to the exemplary embodiment, when a target analyte (such as analyte A through analyte D) is adsorbed by the sensors 20 of the sensor array 18, it changes the electrical properties of each of the sensors $20_1$-$20_8$ in the array 18. However, the analyte may change each individual sensor $20_1$-$20_8$ by a different amount. For example, in the eight-sensor array 18 as shown in FIG. 2, the analyte may drastically change electrical properties of one of the sensors 20 (e.g., the sensor $20_1$) while not affecting the electrical properties of the other of the sensors 20 (e.g., of the sensors $20_2$-$20_8$). Electrical properties include but are not limited to resistance and mobility.

Gases 23 interact with the different functional groups of the different gas sensors 20 in a certain manner based on the chemical affinity and, from the interaction, the gases can be characterized. Gases 23 may respond to a functional group with varying high or low chemical interactions resulting in high or low changes in resistance. Different gases have different effects on the resistivity. The magnitude and sign of the change indicate whether the adsorbed gas molecule is an acceptor or a donor, and how strongly it interacts with a sensor material. These resistance changes over the different sensors $20_1$-$20_8$ can produce a response curve that can be analyzed to characterize the specific gas (as shown in FIG. 2). This effect allows for the detection of changes in resistance. The functionalization of the gas sensors 20 improves selectivity among target gases. The functional groups attached to graphene of the gas sensors 20 selectively capture the target molecules through specific interaction. This enables the measurement of the analytes A through D where the gas sensors 20 are not specifically functionalized to measure those gases.

Thus, the gas sensors 20 are formed or deposited on the substrate 14 as the array 18. Different sensors 20 on the array 18 are provided for different target gases and can have different functional groups, either targeting different analytes or forming an electronic nose with the array 18 of the gas sensors $20_1$-$20_8$. An example of the multi-functional sensor platform is taught by U.S. Pat. No. 11,343,904, the complete disclosure of which is incorporated herein by reference.

A method of manufacturing the sensor platform according to an exemplary embodiment of the present invention comprises the following steps. First, the single chip 12 integrated on the printed circuit board (PCB) is provided. Then, the plurality of gas sensors $20_1$-$20_8$ are formed directly on the substrate 14 of the single chip 12. Specifically, the sensor base layer 21 of each of the gas sensors $20_1$-$20_8$ is formed by depositing a plurality of three dimensional (3D) patterned multi-layered nanostructures directly onto the substrate 14 of the single chip 12. More specifically, each of the sensor base layers 21 is formed by depositing a plurality of three dimensional (3D) patterned multi-layered nanostructures directly onto the substrate 14 of the single chip 12. The sensor base layers 21 are formed using nano-scale additive manufacturing techniques by printing nanomaterials, such as carbon nanotubes (CNT), molybdenum disulfide ($MoS_2$), tungsten disulfide ($WS_2$), etc., directly onto the substrate 14 of the single chip 12. Alternatively, the sensor base layers 21 of graphene, carbon nanotube, or $MoS_2$ are formed using traditional microfabrication processes or an offset printing technique. In other words, according to the exemplary embodiment, each of the plurality of three dimensional (3D) patterned multi-layered nanostructures is formed directly on the substrate 14 by printing nanomaterials in a layer-by-layer manner, known in the art.

Figure 3:
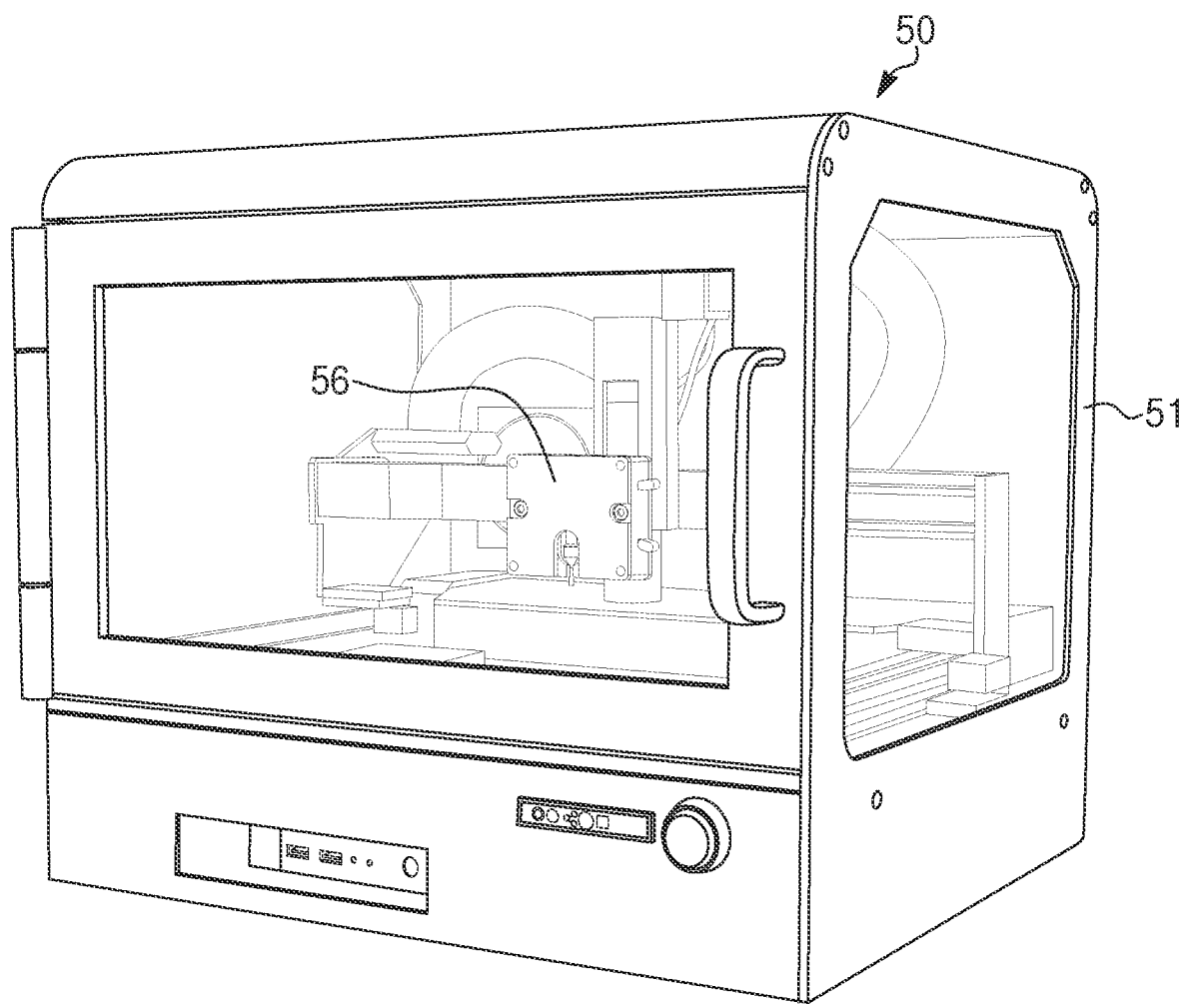
FIG. 3 is a perspective view of a picoliter dispenser used in a method according to the exemplary embodiment of the present invention.
Figure 4:
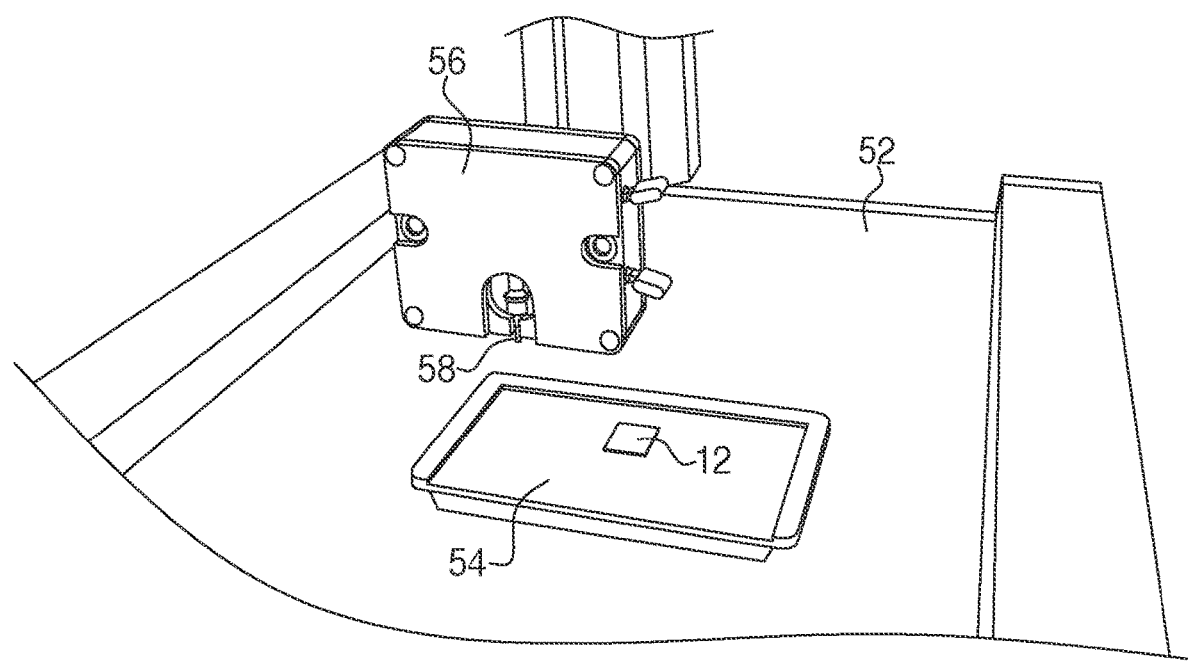
FIG. 4 is an enlarged perspective view of a dispensing head of the picoliter dispenser of FIG. 3 used for depositing nanomaterials directly on a substrate of a chip.

After the sensor base layers 21 are formed as described above, each of the sensor base layers 21 of the gas sensors 20 is functionalized with one of the different functional groups 22, for example, nanoparticles of tin oxide, zinc oxide, platinum, polymers (e.g., polyaniline), palladium, etc., depending on the target gases. The different functional groups 22 are well established and have been demonstrated to induce selectivity for specific gases. Specifically, the nanomaterials of the sensor base layer 21 are functionalized by depositing one of the functional groups 22 directly onto the sensor base layer 21 of each of the gas sensors 20, respectively, using an automated picoliter dispenser 50, best shown in FIGS. 3 and 4. The picoliter dispenser 50 includes a casing 51, a base 52 provided with a support table 54, and a manually or automatically loaded dispensing head 56 disposed above the support table 54 within the casing 51. The dispensing head 56 includes a dispensing nozzle 58 and is provided in combination with disposable dispensing cartridges. The dispensing nozzle 58 of the dispensing head 56 is configured to dispense liquids in a pico-nano-micro liter volume range, i.e., a picoliter (i.e., $10^{-12}$ liter) volume of suspension of various materials, such as one of the functional groups 22, on the sensor base layer 21 of each of the gas sensors 20 with micron precision in highly uniform pixels for the alignment in an automated fashion. The dispensing nozzle 58 of the dispensing head 56 is configured to dispense liquids down to ~30 μm.

A concentrated suspension or solution of cadmium selenide (CdSe) quantum dots (QD) in chlorobenzene and terpineol is used in the dispensing cartridges of the dispensing head 56 to be dispensed onto the substrate 14 of the chip 12. Dispensing of the concentrated suspension of CdSe QD results in highly uniform pixels that can be aligned with respect to reach other. The picoliter dispenser 50 also dispenses suspensions of metal and metal oxide nanoparticles, or polymers, and functionalizes gas sensors 20 with these nanoparticles and polymers. Alternatively, the automated picoliter dispenser 50 dispenses quantum dot, metal, or metal oxide suspensions, or polymeric solution. The picoliter dispenser 50 dispenses the picoliter volume of the suspension or solution very precisely, directly onto the individual sensor bases 21 of the gas sensors 20 in order to functionalize them with particle or other functional groups. Moreover, the different gas sensors 20 on the same substrate 14 can be functionalized with different materials using the precise dispense and alignment.

Figure 5:
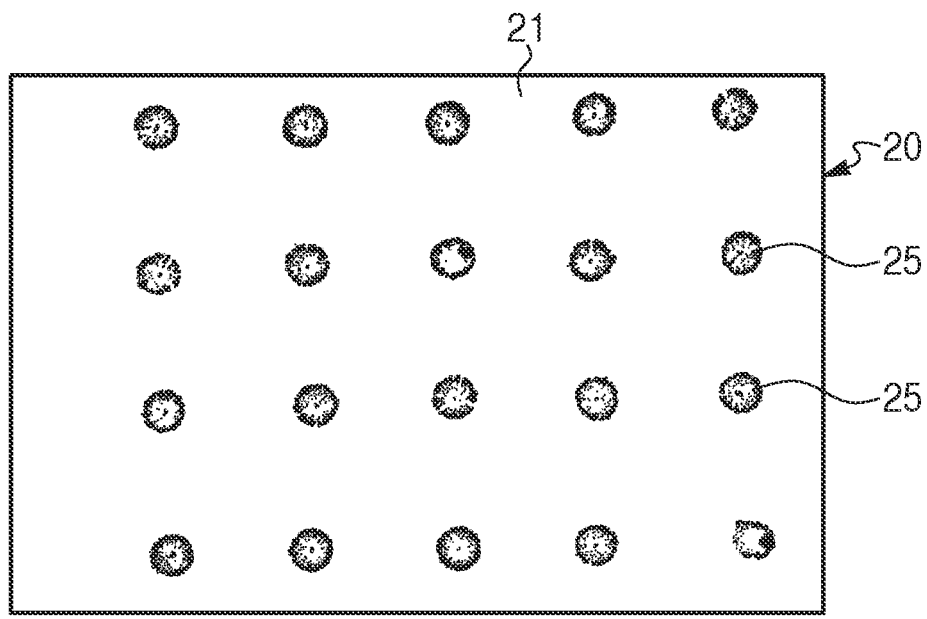
FIG. 5 shows 75 micron size pixels deposited directly onto the substrate of the chip with nanomaterials such as quantum dots.

During the functionalization of the gas sensors 20, the chip 12 with one or more of the sensor base layers 21 printed thereon as disclosed above is secured to the support table 54 of the base 52 of the picoliter dispenser 50 beneath the dispensing head 56. Then, the precision dispensing nozzle 58 of the dispensing head 56 deposits a given functional group 22 on top of the sensor base layer 21 of one of the gas sensors 20 on the chip 12, as shown in FIG. 5. As shown in FIG. 5, 75 µm size pixels of the given functional group 22 are deposited directly on the substrate 14 of the chip 12 with quantum dots 25 of the given functional group 22. The given functional group 22 is deposited on top of the sensor base layer 21 of one of the gas sensors 20 on the chip 12 full of the sensor base layers 21 of other gas sensors 20 without adding the functional group 22 to the rest of the sensor base layers 21 on the chip 12. Thus, the other sensor base layers 21 can be functionalized with other functional groups 22 in order to make the electronic nose 18. As a result, one of the gas sensors 20 is formed on the chip 12.

The picoliter dispenser 50, such as the PicoPRECISE or PicoSpotter, made by Polypico may be used. The PicoPRECISE is an industrial grade microdispensing platform based on the PolyPico dispensing technology. The PicoPRECISE is a robust industrial grade system designed for higher usage and batch production scenarios. Furthermore, the robotics platform of the PicoPRECISE has high accuracy and precision (XY precision: +/−6 µm) and includes the optional target alignment camera system.

According to an alternative method of manufacturing the sensor platform, the chip 12 is secured to the support table 54 of the base 52 of the picoliter dispenser 50 beneath the dispensing head 56. Then, a suspension of material of the sensor base layer 21, such as molybdenum disulfide ($MoS_2$), graphene oxide, or tungsten disulfide ($WS_2$), is formed by mixing the $MoS_2$, graphene oxide, or $WS_2$ with a solvent such as water or ethanol. Next, the suspension of material of the sensor base layer 21 (e.g., $MoS_2$ or $WS_2$) is deposited directly onto the chip 12 with the dispensing head 56 of the picoliter dispenser 50 so as to form the sensor base layer 21 on the chip 12 from the suspension of $MoS_2$ or $WS_2$. In some cases, $MoS_2$ or $WS_2$ constitutes one of the sensors on the multi-functional sensor platform. Next, one of the sensor base layers 21 is functionalized using the dispensing head 56 of the picoliter dispenser 50 to deposit a given functional group on top of the sensor base layer 21 of one of the gas sensors 20 on the chip 12, as described above.

Further alternatively, the material of the sensor base layer 21 and the functional group 22 are deposited together by the picoliter dispenser 50. According to this alternative method, first, the sensor base material is provided in the form of an unfunctionalized suspension of nanomaterials. Then, the unfunctionalized suspension of nanomaterials of the sensor, such as carbon nanotubes (CNT), molybdenum disulfide ($MoS_2$), tungsten disulfide ($WS_2$), etc., is functionalized. Specifically, the unfunctionalized suspension of nanomaterials of the sensor base layer 21, such as carbon nanotubes (CNT), molybdenum disulfide ($MoS_2$), tungsten disulfide ($WS_2$), etc., is mixed with one of the functional groups 22. For example, when using carbon nanotubes as a sensor base layer material, the bulk carbon nanotubes are functionalized, i.e., mixed in a functionalized suspension with nanoparticles of platinum (PT), tin oxide or other materials through solution phase chemistry. Then, the functionalized nanomaterial of the sensor base layer is deposited by the dispensing head 56 of the picoliter dispenser 50 directly onto the substrate 14 of the single chip 12 to make one of the gas sensors 20. (The bulk functionalized nanomaterial can also be printed with other techniques such as direct assembly.) Accordingly, in order to make a plurality of the gas sensors, several functionalized suspensions are formed, each by mixing the unfunctionalized suspension with one of the different functional groups 22, thus forming several separate volumes of the functionalized nanomaterials each including a different functional group 22. Then, each of the volumes of the functionalized nanomaterials is deposited by the dispensing head 56 of the picoliter dispenser 50 directly onto the substrate 14 of the single chip 12 separately to make one of the gas sensors 20. The plurality of the gas sensors 20 are formed on the substrate 14 of the single chip 12 separately and spaced from each other. As a result, the array 18 of the separate gas sensors 20 each including the different functional group 22 is formed on the single chip 12.

The method for manufacturing gas sensors on a single chip of the present invention is simple, less labor intensive and reduces cost of manufacturing gas sensors on a chip, improves precision and sensitivity of the gas sensors, and also protects the nanomaterial-based gas sensors from exposure to photoresists or resist removing solvents that can contaminate the sensors.

According to the exemplary embodiment, patterned nanostructures (i.e., sensors, antenna, etc.), as well as a variety of nanomaterials including carbon nanotube (CNT), graphene, molybdenum disulfide, are deposited on the substrate 14.

The nanomaterials used for the sensors (e.g., gas sensors 20, pressure sensor 24, temperature sensor 26) show excellent sensor properties. For example, the nanomaterials are highly sensitive (i.e., parts per billion or sub parts per billion) at room temperature, they have a high surface-to-volume ratio, superior electrical properties, and are low resource (i.e., small, light, low power). In one embodiment, the nanomaterials are made of a radiation hardened material.

The foregoing description of the exemplary embodiment (s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A method of fabricating a multi-functional platform including at least one gas sensor, the method comprising the steps of:
   providing a printed circuit board (PCB) including a chip integrated on the PCB, the chip including a substrate;
   providing a picoliter dispenser having a moveable dispenser head with a nozzle;
   forming a gas sensor base layer of the at least one gas sensor by depositing a nanostructure directly on the substrate of the chip, the nanostructure including an unfunctionalized nanomaterial; and functionalizing the gas sensor base layer by depositing a functional group of nanomaterial to the gas sensor base layer using the picoliter dispenser so as to form the at least one gas sensor, wherein the step of forming the sensor base layer includes the steps of preparing a suspension of the unfunctionalized nanomaterial of the sensor base layer and depositing the suspension of the unfunctionalized nanomaterial directly on the substrate of the chip using the picoliter dispenser so as to form the sensor base layer of the at least one gas sensor.

2. The method as defined in claim 1, wherein the unfunctionalized nanomaterial includes one of graphene, graphene oxide, carbon nanotube (CNT), molybdenum disulfide ($MoS_2$) and tungsten disulfide ($WS_2$).

3. The method as defined in claim 1, wherein the functional group of nanomaterial includes one of metal or metal oxide nanoparticles, polyaniline, porous ceramic nanoparticles, platinum nanoparticles, zinc oxide nanoparticles, palladium and tin oxide nanoparticles.

4. The method as defined in claim 1, wherein the substrate of the single chip is rigid or flexible.

5. The method as defined in claim 1, wherein the step of forming the gas sensor base layer is performed using a nano-scale additive manufacturing technique or an offset printing technique.

6. The method as defined in claim 1, wherein the multi-functional platform includes a plurality of gas sensors, wherein the step of forming the sensor base layer includes the step of forming a plurality of sensor base layers by depositing a plurality of nanostructures directly on the substrate, and wherein each of the nanostructures forms the sensor base layer of one of the plurality of gas sensors.

7. The method as defined in claim 6, wherein the step of functionalizing the sensor base layer includes the step of functionalizing each of the sensor base layers with at least one of different functional groups by depositing one of the different functional groups of nanomaterials to each of the sensor base layers using the picoliter dispenser so as to form one of the gas sensors.

8. The method as defined in claim 7, wherein each of the gas sensors has a different attached functional group, and wherein the different gas sensors are disposed in an array defining an electronic nose.

9. The method as defined in claim 8, wherein each of the plurality of sensors is functionalized with one of metal or metal oxide nanoparticles, or polyaniline, porous ceramic nanoparticles (NP), platinum NP, polyaniline film, or tin oxide NP.

10. The method as defined in claim 9, wherein each of the gas sensors is configured to detect at least one single gas.

11. The method as defined in claim 10, wherein each of the gas sensors is configured to detect at least one of hydrogen ($H_2$), hydrogen sulfide ($H_2S$), methane ($CH_4$), ammonia ($NH_3$), acetone, and water ($H_2O$).

12. A method of fabricating a multi-functional platform including a plurality of gas sensors, the method comprising the steps of:

providing a printed circuit board (PCB) including a chip integrated on the PCB, the chip including a substrate;

providing a picoliter dispenser having a moveable dispenser head with a nozzle;

preparing a suspension of unfunctionalized nanomaterials provided for forming the plurality of gas sensors;

functionalizing the suspension of the unfunctionalized nanomaterials by mixing the unfunctionalized suspension with a plurality of different functional groups so as to form a plurality of functionalized suspensions each having different functionalized nanomaterials;

depositing a first of the plurality of functionalized suspensions having a first functionalized nanomaterial directly to the chip using the picoliter dispenser so as to form a first of the plurality of gas sensors; and depositing a second of the plurality of functionalized suspensions having a second functionalized nanomaterial directly to the chip using the picoliter dispenser so as to form a second of the plurality of gas sensors, wherein the first of the plurality of gas sensors are spaced apart from the second of the plurality of gas sensors, and wherein each of the plurality of gas sensors is formed by different functionalized nanomaterials.

13. The method as defined in claim 12, wherein the substrate of the single chip is rigid or flexible.

14. The method as defined in claim 12 wherein the unfunctionalized nanomaterials include one of graphene, graphene oxide, carbon nanotubes (CNT), molybdenum disulfide ($MoS_2$) and tungsten disulfide ($WS_2$).

15. The method as defined in claim 12, wherein the one of different functional groups of nanomaterial includes one of metal or metal oxide nanoparticles, polyaniline, porous ceramic nanoparticles, platinum nanoparticles, zinc oxide nanoparticles, palladium and tin oxide nanoparticles.

16. The method as defined in claim 12, wherein each of the plurality of sensors is functionalized with one of metal or metal oxide nanoparticles, or polyaniline, porous ceramic nanoparticles (NP), platinum NP, polyaniline film, or tin oxide NP.

17. The method as defined in claim 12, wherein each of the gas sensors is configured to detect at least one single gas.

18. The method as defined in claim 17, wherein each of the gas sensors is configured to detect at least one of hydrogen ($H_2$), hydrogen sulfide ($H_2S$), methane ($CH_4$), ammonia ($NH_3$), acetone, and water ($H_2O$).

* * * * *